United States Patent [19]
Baker

[11] 3,807,842
[45] Apr. 30, 1974

[54] PRISMATIC ELEMENT
[75] Inventor: Philip G. Baker, Peabody, Mass.
[73] Assignee: Polaroid Corporation, Cambridge, Mass.
[22] Filed: Jan. 3, 1972
[21] Appl. No.: 214,591

[52] U.S. Cl. .............................. 352/78 R, 350/286
[51] Int. Cl. .......................................... G03b 32/02
[58] Field of Search.................... 352/77, 78 R, 130; 350/203, 286

[56] References Cited
UNITED STATES PATENTS
| | | | |
|---|---|---|---|
| 2,068,829 | 1/1937 | Albada | 350/203 |
| 2,443,390 | 6/1948 | Kingston | 350/178 |
| 3,614,194 | 10/1971 | Harris | 350/286 X |
| 3,615,127 | 10/1971 | Land | 352/130 X |
| 3,627,407 | 12/1971 | Cook | 352/78 R |

FOREIGN PATENTS OR APPLICATIONS
152,381  8/1920  Great Britain...................... 350/286

Primary Examiner—Samuel S. Matthews
Assistant Examiner—Alan Mathews

[57] ABSTRACT

An optical system employing a prism of minimized dimensions capable of extending the geometrical distance between a source of converging light and its focal point. The prism has a light-receiving transparent face and a flat reflective surface for redirecting illumination through a second transparent face having a distinctive convex surface through which the beam of light exits from the prism. The distinctive convex configuration and its location upon the second transparent face permits minimization of critical dimensions of the prism.

14 Claims, 8 Drawing Figures

PATENTED APR 30 1974

PATENTED APR 30 1974 3,807,842

PRISMATIC ELEMENT

BACKGROUND OF THE INVENTION

The field of motion picture photography, although old, has been the subject recently of various technical improvements. Motion picture film cassettes are now commercially available and are adapted to be quickly mounted as a unit into a camera for exposure purposes. Unfortunately, the exposed cassette must be mailed to a film processing laboratory, thereby resulting in a time delay between exposure and viewing.

More recently, the motion picture photography field has been provided with film handling cassettes characterized in that the film need never be removed from the cassette during exposure, development, projection and editing operations. Such cassettes are described in U.S. Pat. Nos. 3,584,944 issued June 15, 1971, in the name of Gerald H. Cook; U.S. Pat. No. 3,597,062 issued Aug. 3, 1971 in the name of Rogers B. Downey; U.S. Pat. No. 3,615,127 issued Oct. 26, 1971 in the name of Edwin H. Land; and U.S. Pat. No. 3,584,942 issued June 15, 1971 in the name of Rogers B. Downey, all of which are assigned to the assignee of the present invention.

Those skilled in the art know and can readily appreciate that the effective packaging and intergration of the elements of the distinctive film handling cassettes mentioned above require that careful consideration be given to critical space and geometric limitations. These problems are compounded in the case of cassettes employed in a projector where provision must be made for bringing the projector's illumination system into operative relationship with the film strip contained in the cassette. The essential elements of such cassettes include both take-up and supply reels for transporting motion picture film across a film aperture which functions as both an exposure and projection station. Also included within the cassette is a processing assembly for developing the exposed film together with a prism which functions as an optical element for the projection system. The dimensions of certain of these essential elements, such as the take-up and supply reels are fixed by pragmatic considerations. Accordingly, effective packaging requires that special consideration be given to a reduction of the dimensions of the remaining elements of the cassette so that an effectively integrated and compact unit may be produced.

One of the areas of major concern in dimensional minimization is the projection system. The relative compactness of a film cassette of the type previously mentioned depends largely upon the optical element used within such a system. An optical element incorporated within such a cassette must be capable of functioning effectively as an optical element within a projection system and yet at the same time satisfy minimal dimensional constraints imposed upon it by the overall cassette dimensions.

The problem noted above can be in part resolved in accordance with the invention disclosed in commonly assigned U. S. Pat. Application Ser. No. 767,609 filed Oct. 15, 1968 by Herbert A. Bing and now abandoned in favor of Steamlined Continuation Application Ser. No. 118,963 filed Feb. 25, 1971. In accordance with the invention disclosed therein, the thickness of a film handling cassette may be minimized by employing a prism having a light-receiving concave transparent face and a flat reflective surface for redirecting illumination through a second transparent convex face. The present invention is directed to an improved prism of the type described in application Ser. No. 767,609 and provides additional advantages relating to a further reduction in the dimensional constraints imposed upon cassettes using such prisms.

SUMMARY OF THE INVENTION

The present invention is addressed to a novel prism and film handling cassette employing such a prism. Essentially, the prism of the present invention comprises a first transparent light-receiving face and a flat reflective surface for redirecting illumination through a transparent convex portion of a second face. The remaining portion of the second face, not associated with the exiting light, has an integral relationship with the first transparent face whereby a dimensional minimization of the second face may be realized.

Accordingly, the present invention serves as a radical improvement over the prior art by providing an effective illumination system which may be employed with compact motion picture film cassettes in a minimum amount of space.

The features and objects of the present invention as well as its advantages when employed in a film handling cassette may be more fully understood and appreciated by reference to the following detailed description of the invention taken together with the attached drawings.

DETAILED DESCRIPTION OF THE DRAWINGS

Figure 1:
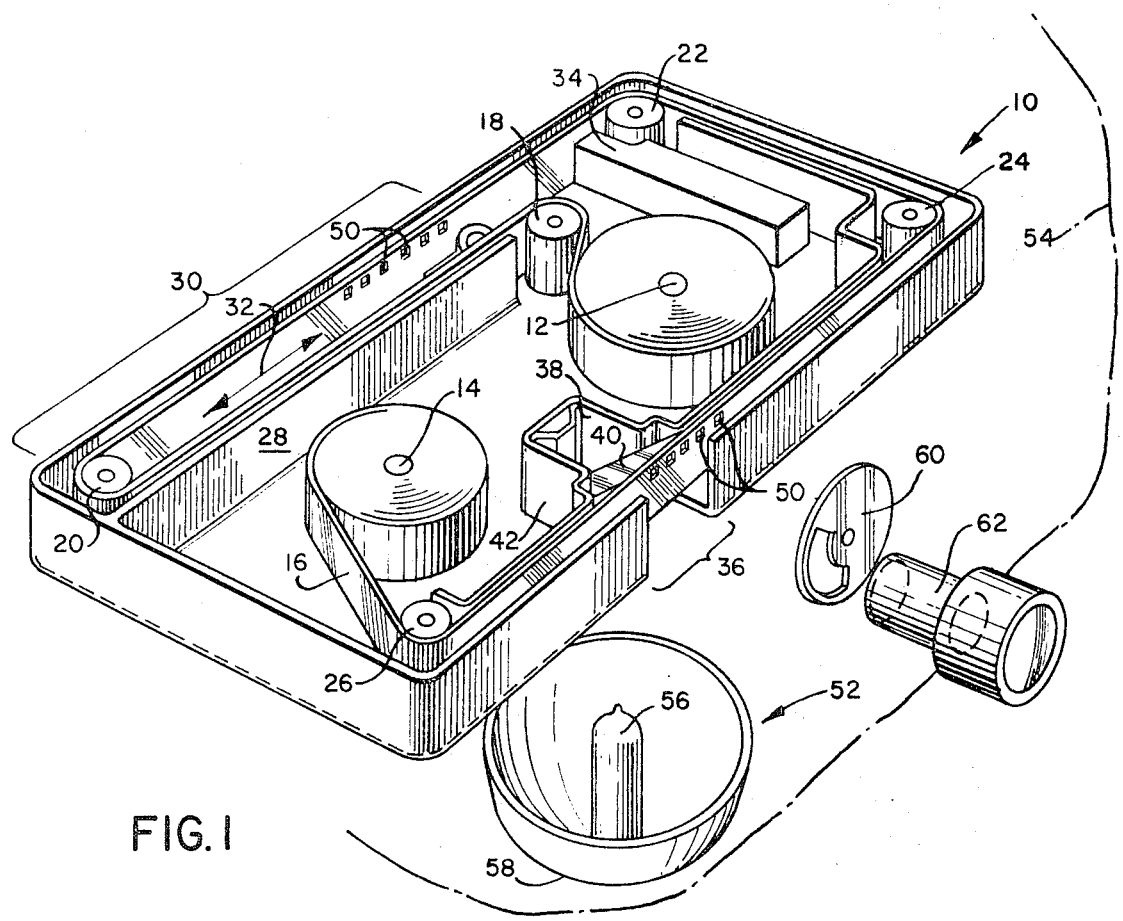
FIG. 1 is a diagrammatic perspective view of a motion picture film system including a compact multipurpose cassette mounted in a projector and embodying features of this invention.

Referring to FIG. 1, there is shown a cassette structure 10 into which the present invention is incorporated. Cassette 10 includes a supply reel 12 and a take-up reel 14. Attached to each of these reels 12 and 14 are the respective ends of a strip of motion picture film 16. Strip 16 passes from supply reel 12 to a series of idlers 18,20,22,24, and 26. Additionally disposed within cassette 10 is a baffle plate 28 which, in conjunction with a wall section 30, defines a drying chamber 32 through which film 16 is transported as it passes between idlers 18 and 22 and around idler 20. Positioned in close proximity with idler 22 is a container 34 of viscous development composition suitable for developing latent images recorded on film strip 16 during exposure. Suitable means (not shown) are included within chamber 34 for applying the viscous development composition upon film strip 16 subsequent to exposure.

Cassette 10 is also provided with a film aperture 36 across which film strip 16 passes in traveling between idlers 24 and 26. Located within film aperture 36 is a pressure plate (not shown) which correctly positions film strip 16 for purposes of exposure and projection. The pressure plate includes an aperture formed therein (not shown) through which a photographic image is passed for exposing the film strip 16. Provided behind film aperture 36 and film strip 16 is a recess 38 in which is permanently mounted a prismatic element 40. Disposed behind film aperture 36 and around the built-in prismatic element 40 is a baffle member 42 which extends partially around idler 26 and around idler 24 toward the idler 22 to prevent light from penetrating the interior of the cassette's structure itself.

Figure 2:
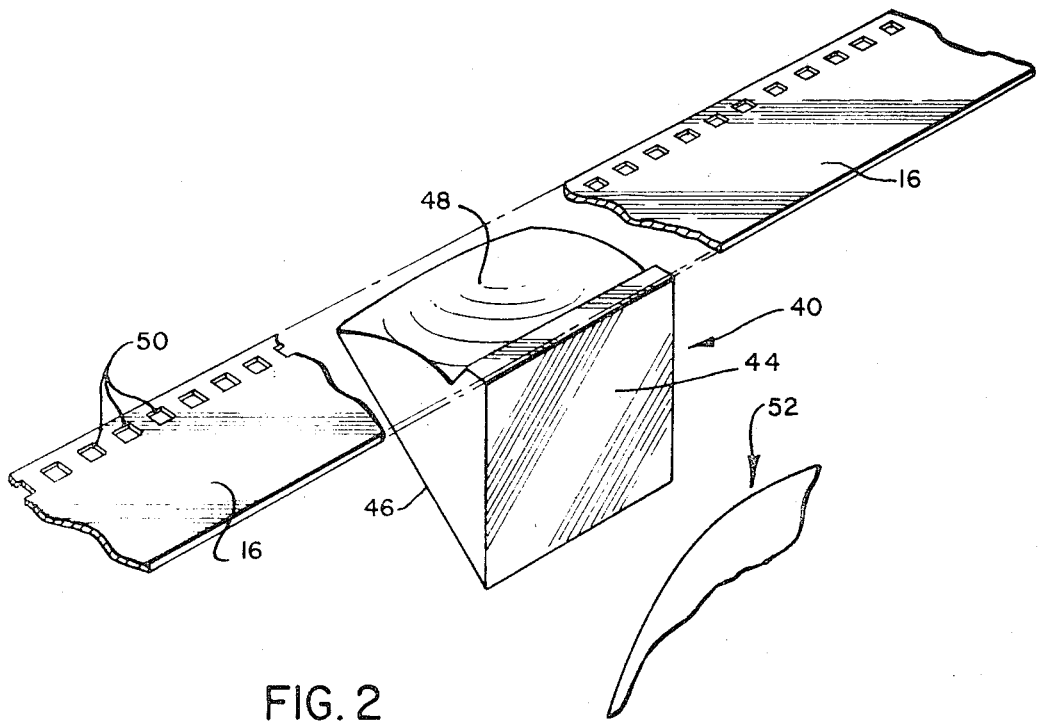
FIG. 2 is a perspective view of a preferred form of prismatic element mounted in the cassette of FIG. 1.

A detailed configuration of the prismatic element 40 is shown in FIG. 2 of the drawings. In its preferred form it includes a light-receiving transparent planar face 44. A flat reflecting surface 46 is angularly disposed behind the light-receiving transparent face 44 and redirects light entering prismatic element 40 outwardly through a second transparent face 48, which is convex in nature, onto the film strip 16 and thence through the film aperture 36.

Cassette 10 is initially furnished with most of the film strip 16 in its photosensitive state coiled on supply reel 12. For exposure purposes, the cassette 10 is mounted in an appropriate camera (not shown) with the take-up reel 14 engaging suitable drive means of the camera. In this use the film aperture 36 serves as an exposure station through which images are directed by the camera lens (not shown) through a camera shutter (not shown) onto the photosensitive film 16 in its passage from the supply reel 12 to the take-up reel 14. During the exposure sequence, the film drying chamber 32 is inoperative and the viscous development composition in container 34 is not emitted. Film 16 is drawn onto the take-up reel 14 by power supplied thereto from the camera and is advanced past the film aperture 36 in incremental steps by a typical claw mechanism (not shown) co-operating with sprocket holes 50 appropriately provided in the film strip 16. An illumination system 52 provided in a projector shown generally at 54 consists basically of a lamp 56 and a condenser or reflector 58. Condenser 58 directs a cone of converging light onto the light-receiving transparent face 44 of prismatic element 40 positioned in the recess 38 of cassette 10. The converging beam of light from illumination system 52 is redirected by the flat reflecting surface 46 outwardly through the element's second transparent face 48 and thence through the film strip 16, through a shutter mechanism 60 of projector 54 and into a projection lens 62 located at its focal point.

For a fuller explanation of the exposure and processing operations employed within cassette 10, reference should be made to U. S. Pat. No. 3,615,127 issued Oct. 26, 1971, in the name of Edwin H. Land and the above identified being assigned to the assignee of the present invention. However, as previously indicated, the present invention is directed to a unique prism configuration and the advantageous embodiment of such a prism in a compact multipurpose film handling cassette. Consequently, many details of the cassette's structure per se do not constitute a part of the present invention and may obviously take forms other than those shown herein.

The particular highly desirable advantages derived from the present invention can best be appreciated by referring to the various illustrations comprising FIG. 3 of the drawings. In FIG. 3a, a commercially available illumination system 52 is illustrated, consisting of a lamp 56 and a reflector 58. Reflector 58 directs a converging beam of light 64 to a focal point 66. Typical of such an illumination system is the DNF halogen lamp 150 QTB/LVD marketed by the Photolamp Products Division, Sylvania Electric Products, Inc. of Salem, Mass. In such a system, the diverging rays of light emitted by lamp 56 are collected by reflector 58 and directly focused at the focal point 66. Alternately, the illumination system may take the form of more traditional types such as those wherein the focal point of the reflector is at the lamp itself and a lens positioned in front of the lamp focuses a converging beam of light carrying the filament image at a particular focal point. The nature of illumination system 52 is determinative of a distance $d_1$ between the lamp 56 and the focal point 66 of the converging beams 64. In projection systems, a frame of fully developed image-bearing film strip or a slide of fully developed image-bearing film 68 is positioned between the focal point 66 and the lamp 56 to intercept the converging beam of light 64. For effective operation, it is necessary that the frame of film 68 be positioned a fixed distance $d_2$, determined by the size of the frame, from the lamp 56 such that the entire converging beam passes through the frame and completely illuminates the images recorded thereon. The nature of the projection lens located at the focal point 66 is determined by the size of the filament of lamp 56, i.e., the filament image at the focal point 66 is preferably completely contained within and substantially fills the effective aperture of the lens.

The situation described above assumes a degree of physical proximity between film 68 and lamp 56, i.e., the distance between the two being approximately equal to $d_2$. This proximity is not available within the confines of projector 54, the actual distance between lamp 56 and film 68 being equal to some distance $d_3$ (see FIG. 3d) greater than either $d_2$ or $d_1$. Accordingly, it is apparent that the converging beam of light 64 must be extended in order to elongate the focal distance $d_1$ of lamp 56. For purposes of explanation, it is assumed for the moment that it is unnecessary for light beam 64 to be bent 90° for projection through projection lens 62.

Reiterating, for effective utilization, the nature of the projection lens and the illumination system bear a fixed relationship and the nature of the illumination system determines fixed distances between the lamp and the film and between the lamp and the projection lens. For instance in the case of the aforementioned illumination system, which will be assumed to be utilized in all of the systems illustrated in FIG. 3, and employing an f/1.0 lens having a focal length of 28 mm. and "Super-8" type of film developed by Eastman Kodak Company of Rochester, N.Y., the distance $d_1$ is fixed at 38 mm. and the distance $d_2$ is fixed at 34 mm.

In many applications of this type, no dimensional or space problems are encountered. However, in other applications such as that illustrated in FIG. 1 wherein use is made of a compact multi-purpose cassette and/or wherein the converging beam of light must be redirected between the illumination system and the projection lens, spacing can and in fact quite often does become a major or critical consideration.

Figure 3A:
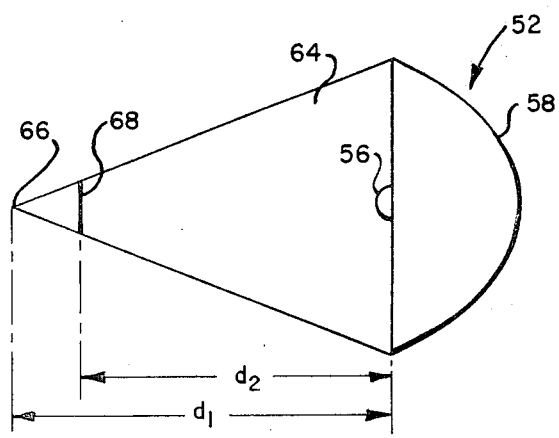
FIG. 3 constitutes a number of diagrammatic illustrations explanatory of the advantages derived from this invention.
Figure 3B:
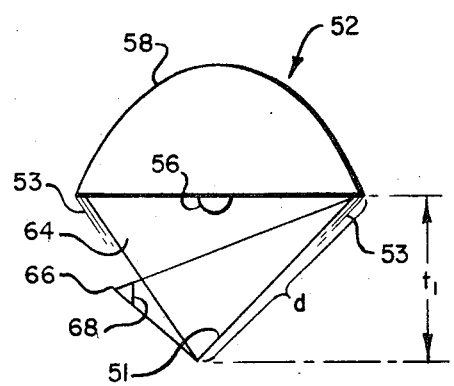

This fact is illustrated in FIG. 3b which depicts the prior art practice of utilizing a mirror 51 to redirect a converging beam of light 64 emitted from illumination system 52, in this instance consisting of the lamp 56 and reflector 58. Since the geometrical distances $d_1$ and $d_2$, between the lamp 56 and the focal point 66 and the lamp and the frame 68, respectively, are fixed, the lamp 56 must be positioned relatively close to the mirror 51 in order for the frame 56 to be positioned so as not to intercept the converging beam 64 as it travels between the illumination system 52 and the mirror 51. Since lamp 56 must be placed in close proximity to mirror 51, it is necessary that the mirror be of a substantial length d to receive at least a major portion of the converging light beam 64. Alternately, if the mirror is positioned within the recess 38 of cassette 10, the cassette must have a substantial minimum thickness $t_1$ (see FIG. 3b). In this instance it is impossible for all of the rays of light emanating from reflector 58 to be intercepted by the mirror 51. This situation is illustrated in FIG. 3b in which the lost rays of light are indicated generally by 53. In the case above, wherein the described Sylvania illumination system is used in conjunction with a 28 mm. f/1.0 lens and "Super-8" film and a mirror 51 utilized to effect a 90° redirection of the converging beam 64, the system's effective illumination is reduced to approximately an f/1.2 system and the minimum height of the mirror or minimum thickness of the cassette is established at 1.2 inches.

Figure 3C:
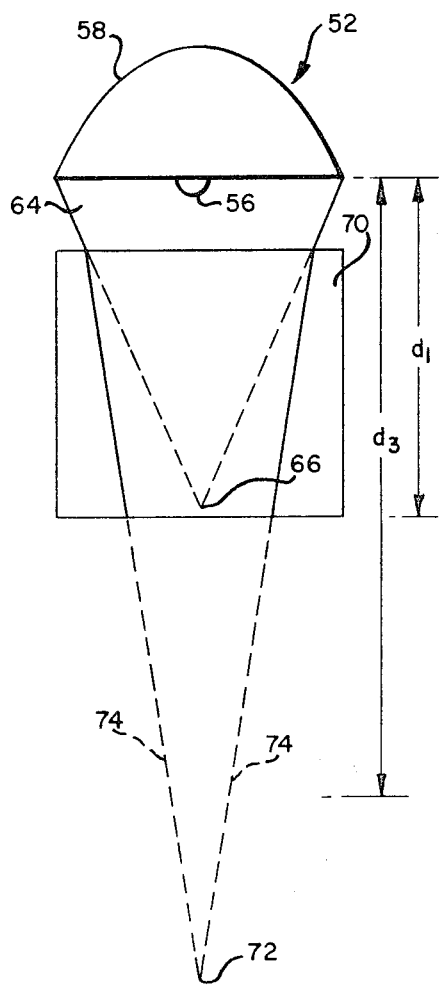
Figure 3D:
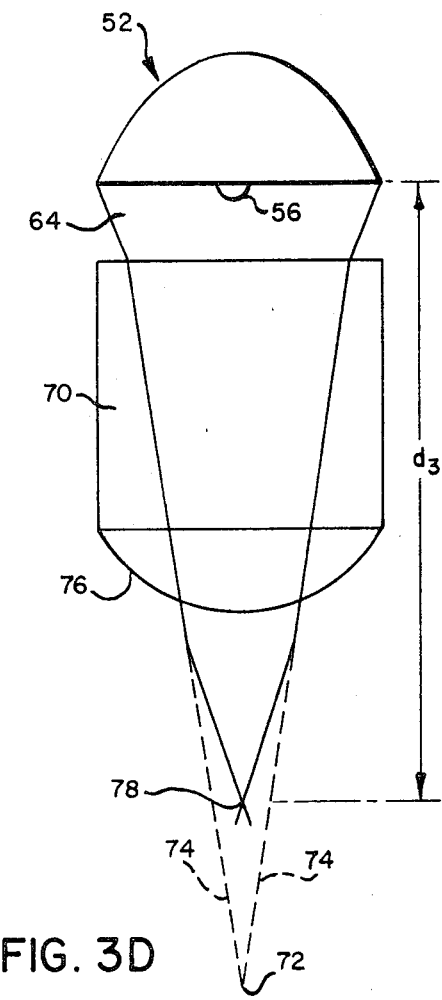

Reference is now made to FIG. 3c. Placed in front of lamp 56 is a plano-plano lens 70. Lens 70 has a diverging effect upon converging light beam 64 and elongates the focal point of lamp 56 to a point 72 as shown by light rays 74. It is evident that focal point 72 is now at a distance greater than distance $d_3$ and therefore must be shortened. In order to move focal point 72 inwardly so that it is at distance $d_3$, a convex lens 76 is placed in front of lens 70. This situation is shown in FIG. 3d. The converging light beam 64 is now focused at a point 78 which is a distance $d_3$ from lamp 56. As previously mentioned, it was assumed that the light beam 64 need not be bent at 90° and therefore a "straight through" representation could be used. The true situation, however, is such that light beam 64 must be bent 90° in order for the light from illumination system 52 to get through film 16 and into projection lens 62.

Figure 4:
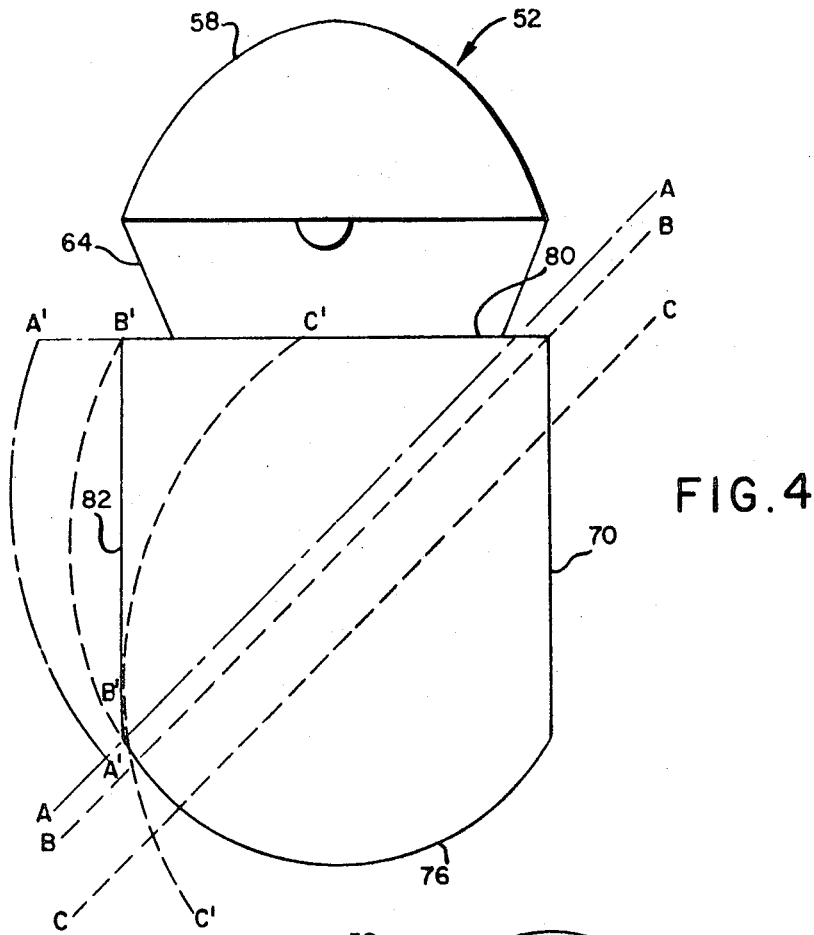
FIG. 4 is a diagrammatic representation of a lens counterpart to the present invention.

Looking to FIG. 4, there are shown three various ways of folding composite lens structure 70 and 76 back upon itself to achieve an equal prism structure which will bend the light from lamp 56 at 90°. All foldings are made at a 45° angle to a first transparent face 80 to achieve a 90° deviation of light beam 64. A folding of the lens structure along line A—A results in the convex surface of lens 76 being placed at A'—A'. The placement of the convex surface at A'—A' increases the horizontal dimension of the prism thereby placing the convex surface A'—A' at a point which corresponds with the film plane of cassette 10. Accordingly, film 16 would have to be spaced further away necessitating an increase in the width of cassette 10. In the same manner a folding along line B—B places the convex surface along B'—B'. While reducing the disadvantages of the A—A folding, the B—B configuration does not present sufficient physical latitude for use in a compact cassette such as cassette 10.

In order to permit a more compact prism configuration, the lens structure of FIG. 4 is folded along a line C—C. As a result, the convex surface of lens 76 is placed along the line C'—C', tangent to a side face 82 of plano-plano lens 70. Configured as such, the resulting prism arrangment affords a compact structure with the capability of focusing the converging light beam close to the film plane subsequent to a 90° redirection. A representation of such a prism as described above, along with light ray tracings, may be seen by referring to FIG. 5 of the attached drawings.

Figure 5:
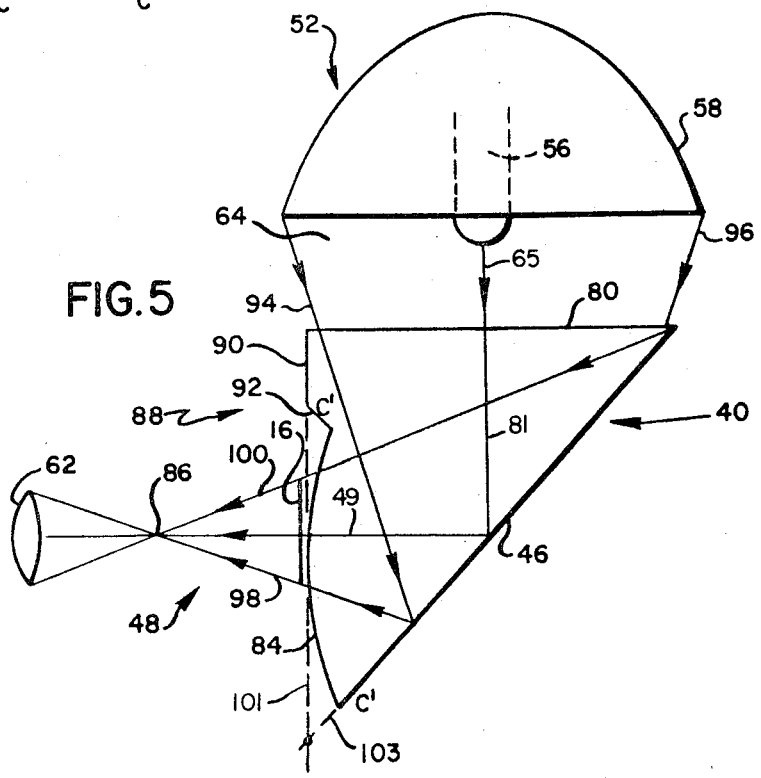
FIG. 5 is a diagrammatic representation of the present invention explanatory of the advantages included therein when employed within a compact motion picture cassette.

Prism 40, as shown in FIG. 5, is composed of three optical faces. A first transparent face 80 is formed as a planar surface which permits converging light beam 64 to enter prism 40. First transparent face 80 has an optical axis 81 which is aligned co-axially with respect to the optical axis 65 of converging light beam 64. As may be evidenced from the light rays shown, light beam 64 is reflected by flat reflecting surface 46 subsequent to its entrance into prism 40. Flat reflecting surface 46 is positioned at an angle of 45° with respect to first transparent face 80 for effecting a 90° redirection to beam 64. After reflection from surface 46, light beam 64 passes through the remaining portion of prism 40 (see FIG. 5) and exits through a transparent convex surface 84 formed as part of second face 48. Transparent convex surface 48 is formed with its optical axis 49 positioned substantially normal to the optical axis 81 of first transparent face 80. Accordingly, convergent light beam 64 is redirected a full 90° from its entrance into prism 40 to its exit from transparent convex surface 84. Passage through surface 84 effects a convergency upon beam 64, the latter being focused at a point 86 proximate the film plane of film strip 16. Beam 64 is then passed through projection lens 62 for appropriate projection and viewing.

In addition to including convex surface 84, second face 48 contains a second portion shown generally at 88. Second portion 88 is formed as a non-transmitting transparent face for connecting convex surface 84 with first transparent face 80 in such a manner as to maximize the entrance dimensions of face 80 while reducing the horizontal distance between convex face 84 and reflecting surface 46. Portion 88 has a first planar part 90 substantially perpendicular to first transparent face 80 and extending downwardly therefrom. A second planar part 92 of portion 88 extends between first part 90 and convex surface 84, its extension being substantially perpendicular to flat reflective surface 46.

The configuration and location of parts 90 and 92 of portion 88 permit the reduction of the horizontal measurements of prism 40 while establishing a maximized first transparent light receiving face 80. First transparent face 80 is positioned and dimensioned so as to fully accept converging light beam 64 shown with its limiting rays 94 and 96. Rays 94 and 96 are reflected from surface 46 as shown and exit from convex surface 84 as rays 98 and 100 respectively. With the configuration as shown, prism 40 permits the uninterrupted reflection of ray 96, and more important, ray 94. Comparing the C—C' configuration of FIG. 4 with the preferred embodiment shown in FIG. 5, it can be seen that if convex surface 84 is placed along C'—C' ray 94 will enter prism 40 through convex surface 84. Should this be permitted, ray 94 will be adversely affected and focal point 86 would be relocated. It is for this reason that light ray 94 must enter prism 40 through first transparent face 80. Accordingly, first transparent face 80 is retained at its full size by configuring parts 90 and 92 as shown. Ray 94 is now permitted to enter face 80 and pass uninterrupted to reflective face 46 and then through convex surface 84. It should be noted that the configuration of parts 90 and 92 permit light ray 94 to enter prism 40 and pass to reflective surface 46 uninterrupted. Specifically, the point of connection between convex surface 84 and planar part 92 is not placed deep enough into the prism to intercept any portion of ray 94. If it were, ray 94 would enter surface 80 and exit through planar part 92 and re-enter through convex surface 84. Such a path of travel would adversely effect the convergency of beam 64 as a whole. Therefore, it is important that planar parts 90 and 92 be configured as shown. As mentioned previously, second portion 88 of face 48 does not transmit light. This may be evidenced by reference to the ray tracings of limiting light rays 94 and 96 within prism 40. Since beam 64 exits through only a portion of second face 48, there is no need to form all of face 48 as a convex surface. Therefore, the preferred embodiment shown is ideal in showing the multipurpose functions of permitting a maximized entrance surface (80) and allowing for a convex exit surface with minimized horizontal dimensions for the entrance surface size.

The compact nature of prism 40 may be best shown by referring to FIGS. 4 and 5. As discussed previously, a prism configuration similar to that shown in FIG. 4 (A'—A' or B'—B') results in a prism having a convex surface which extends beyond the forwardmost portion of first transparent face 80. As a consequence, the horizontal dimension of the prism is increased (as compared to prism 40) and the important compact nature of the prism and film handling cassette is destroyed. Similarly, the prism 40 configuration reduces the vertical dimension as compared to a 45° right angle prism with a first face equal in size to that of first transparent face 80. Referring to FIG. 5, there is shown the relative size of prism 40 as compared to the above mentioned 45° right angle prism. Dashed lines 101 and 103 exemplify the salient feature the right angle prism discussed. It should be apparent that prism 40 has a smaller vertical dimension than the right angle prism consisting of lines 101, 103, surface 46 and face 80. This dimensional reduction permits cassette 10 to be formed as a more compact unit with smaller overall dimensions. Additionally, the optical path length of prism 40 is the same as that of the 45° right angle prism having the larger vertical and horizontal dimensions discussed above.

Due to the complexity of grinding convex surface 84 proximate to its junction with part 92, the prism 40 is formed through a molding process. Certain clear plastic materials such as Plexiglass V-1001 with an index of refraction equal to 1.492, can be advantageously employed since they readily lend themselves to low cost mass production techniques. It is, of course, necessary that the selected material have an index of refraction substantially greater than that of air.

In its preferred embodiment, prismatic element 40 contains the following parameters for a unit focal length, F, which are presented in the following table:

| F = 1,000 | | $n = 1.49$ |
|---|---|---|
| Surface | Radius | distance |
| $R_1(84)$ | 0.49 F | $d_1 = 0.27$ F |
| $R_2(46)$ | plano | $d_2 = 0.30$ F |
| $R_3(80)$ | plano | |

$d_1$ = the distance between $R_1$ and $R_2$
$d_2$ = the distance between $R_2$ and $R_3$
Surface $R_3$ has a clear aperture diagonal of 0.55 F It should be understood that the reflecting surface 46 may be either entirely metalized with a suitable material, such as aluminum or silver, or only partially metalized. In the latter case, this surface 46 would only be metalized on that portion where the angle of incidence of the reflected light rays 94 and 96 is less than the critical angle at which they are refracted parallel to that surface. In this manner the total internal reflection characteristic of the uncoated portion of the reflective surface 46 can be utilized to improve the illuminating efficiency of the prismatic element 40.

In order to avoid imparting any distortion to images carried by a beam of light passing through the prismatic element 40, the convex transparent face 80 is preferably radially symmetric, i.e., either spherical or aspherical in nature.

In view of the foregoing, it will be appreciated that the use of prism 40 effectively folds the converging light beam 64 in such a manner as to effect a 90° reorientation thereto. Prism 40 is so constructed as to provide for a maximized entrance face thereby permitting full capture of substantially all of converging light beam 64. Additionally, the unique configuration of prism 40 permits the incorporation of a convex face 84 without enlarging the horizontal dimensions of prism 40 beyond that of a single right angle prism. This latter advantage allows the employment of the prism into a more flat and compact cassette structure.

This invention may be practiced or embodied in still other ways without departing from the spirit and essential character thereof. Therefore, the preferred embodiment described above is illustrative and not restrictive, the scope of the invention being indicated by the accompanying claims.

What is claimed is:

1. A film handling cassette adapted to be mounted within a film camera and within a projection system, said film handling cassette comprising:

a housing;

a strip of photographic material;

an exposure station through which said strip of photographic material is passed for exposure, said exposure station also serving as a projection station through which said strip of photographic material is passed for projection;

means for moving said photographic material through said exposure station when said cassette is in said camera and when said cassette is in said projection system; and a compact optical prism positioned within said exposure station for transmitting illumination directed along a first optical axis from a source of converging light directed along a first optical axis and redirecting said illumination along a second optical axis for illuminating a strip of exposed photographic material, said optical prism comprising:

a first transparent face of a given size for permitting illumination from such a light source to enter said prism, said source of converging light illuminating substantially all of said first transparent face, said first transparent face having an optical axis substantially aligned with the optical axis of said converging light source;

a reflective surface angularly disposed with respect to said first transparent face for redirecting substantially all of said illumination entering said prism through said first transparent face; and a second face connecting said first transparent face with said reflective surface, said second face including a transparent convex portion having an optical axis substantially normal to the optical axis of said first transparent face, said transparent convex portion providing for the exiting of substantially all of said redirected illumination, and a second portion for connecting said transparent convex portion with said first transparent face, said transparent convex portion and said second portion being totally contained behind a plane normal to the optical axis of said transparent convex face at the point of intersection of said first transparent face with said second portion so as to establish the smallest prism for a given first transparent face.

2. The film handling cassette according to claim 1 in which said transparent convex portion is tangent to said plane normal to said optical axis of said transparent convex portion.

3. The film handling cassette according to claim 1 in which said prism has the same optical path length as is contained within a 45° right angle prism of the same transparent surface boundaries as said prism.

4. The film handling cassette according to claim 1 in which said reflective surface angularly disposed with respect to said first transparent face connects said first transparent face to said transparent convex portion.

5. The film handling cassette according to claim 1 in which said first transparent face is planar.

6. The film handling cassette according to claim 1 in which said reflective surface is formed as a planar face and is disposed at an angle of 45° with respect to the optical axis of said first transparent face.

7. The film handling cassette according to claim 6 in which said second portion of said second face comprises a first section substantially perpendicular to said first transparent face and a second section angularly disposed with respect to said first section for connecting said transparent convex portion with said first section.

8. The film handling cassette according to claim 7 in which said first section and said second section are planar and transparent.

9. The film handling cassette according to claim 1 in which at least a portion of said reflective surface is silvered.

10. The film handling cassette according to claim 1 in which said transparent convex portion and said second portion are oriented so as to permit said illumination from said source of convergent light to enter said prism at said point of intersection of said first transparent face and said second portion without impinging upon said transparent convex portion or said second portion.

11. The film handling cassette according to claim 1 in which said prism is molded plastic.

12. A motion picture film handling cassette adapted to be mounted within a motion picture film camera and subsequently, within a projection system, said film handling cassette comprising:

a housing;
a strip of photosensitive material;
a supply reel upon which substantially all of said strip of photosensitive material is stored prior to the exposure of said photosensitive material;
a take-up reel positioned co-planar with respect to said supply reel for storing said photosensitive material subsequent to said exposure;
an exposure station through which said strip of photosensitive material is passed for exposure, said exposure station also serving as a projection station through which said strip of photosensitive material is passed for projection; and
an optical prism positioned within said exposure station for taking illumination from a source of converging light and redirecting said illumination for illuminating said strip of exposed photosensitive material, said optical prism comprising:

a first transparent face for permitting illumination from said source of convergent light to enter said prism;

a reflective surface angularly disposed with respect to said first transparent face for redirecting substantially all of said illumination entering said prism through said first transparent face; and a second face connecting said first transparent face with said reflective surface, said second face including a transparent convex portion having an optical axis substantially normal to the optical axis of said first transparent face, said transparent convex portion being operative to permit the exiting of substantially all of said redirected illumination, and a second portion for connecting said transparent convex portion with said first transparent face, said second portion including a first section substantially perpendicular to said first transparent face, and a second section angularly disposed with respect to said first section, said second section being oriented perpendicular to said reflective surface, said transparent convex portion and said second portion being contained behind a line normal to said first transparent face at the forwardmost point of intersection of said first transparent face with said second portion, whereby the physical size of said prism is minimized for a given size of said first transparent face resulting in a minimization of the dimensions of said cassette for a given film size and length.

13. A motion picture film handling cassette adapted to be mounted within a motion picture film camera and subsequently, within a projection system, said film handling cassette comprising:

a housing;
a strip of photosensitive material;
a supply reel upon which substantially all of said strip of photosensitive material is stored prior to the exposure of said photosensitive material;
a take-up reel positioned co-planar with respect to said supply reel for storing said photosensitive material subsequent to said exposure;
an exposure station through which said strip of photosensitive material is passed for exposure, said exposure station also serving as a projection station through which said strip of photosensitive material is passed for projection; and
an optical prism positioned within said exposure station for taking illumination from a source of converging light and redirecting said illumination for illuminating said strip of exposed photosensitive material, said optical prism comprising:

a first transparent face for permitting illumination from said source of convergent light to enter said prism;

a reflective surface angularly disposed with respect to said first transparent face for redirecting substantially all of said illumination entering said prism through said first transparent face; and a second face connecting said first transparent face with said reflective surface, said second face including a transparent convex portion having an optical axis substantially normal to the optical axis of said first transparent face, said transparent convex portion being operative to permit the exiting of substantially all of said redirected illumination, and a second portion for connecting said transparent convex portion with said first transparent face, said transparent convex portion and said second portion being contained behind a line normal to said first transparent face at the forwardmost point of intersection of said first transparent face with said second portion, said prism having the following parameters for a unit focal length, F, presented in the following table:

| Surface | F=1.000 Radius | n=1.49 distance |
|---|---|---|
| $R_1$ | 0.49 F | $d_1 = 0.27$ F |
| $R_2$ | plano | $d_2 = 0.30$ F |
| $R_3$ | plano | | wherein $d_1$ is the distance between $R_1$ and $R_2$; $d_2$ is the distance between $R_2$ and $R_3$; surface $R_3$ has a clear aperature diagonal of 0.55 F; and surface $R_2$ is reflective and is oriented at 45° to surface $R_3$ for effecting a 90° redirection to a light ray normal to surface $R_3$.

14. The film handling cassette according to claim 13 in which said transparent convex portion is tangent to said line normal to said first transparent face.

* * * * *